United States Patent [19]
Hettche et al.

[11] Patent Number: 4,459,388
[45] Date of Patent: Jul. 10, 1984

[54] PREPARATION OF EMULSIFIABLE POLYETHYLENE BY OXIDIZING POLYETHYLENE IN A FLUIDIZED BED REACTOR

[75] Inventors: Albert Hettche, Hessheim; Stefan Weiss, Neckargemuend; Peter Miederer, Hassloch; Lutz Goethlich, Limburgerhof; Jüergen Ciprian, Frankenthal, all of Fed. Rep. of Germany

[73] Assignee: BASF Aktiengesellschaft, Ludwigshafen, Fed. Rep. of Germany

[21] Appl. No.: 350,357

[22] Filed: Feb. 19, 1982

[30] Foreign Application Priority Data

Mar. 27, 1981 [DE] Fed. Rep. of Germany ....... 3112163

[51] Int. Cl.$^3$ .............................................. C08F 8/06
[52] U.S. Cl. .............................. 525/376; 525/333.8; 525/387; 106/270
[58] Field of Search ................ 106/270; 525/376, 387, 525/388, 333.8

[56] References Cited

U.S. PATENT DOCUMENTS

| | | | |
|---|---|---|---|
| 3,153,025 | 10/1964 | Bush et al. | 260/88.2 |
| 3,243,310 | 3/1966 | Hull | 106/270 |
| 3,285,902 | 11/1966 | Schmeidl | 525/333.8 |
| 3,293,112 | 12/1966 | Kehr et al. | 161/219 |
| 3,322,711 | 5/1967 | Bush | 525/333.8 |
| 3,329,667 | 7/1967 | Braude | 525/387 |
| 3,434,993 | 3/1969 | Mirabile | 525/387 |
| 3,444,155 | 5/1969 | Fish | 525/387 |
| 3,519,588 | 7/1970 | Hagemeyer | 525/387 |
| 3,562,788 | 2/1971 | Weemes | 525/388 |
| 3,692,877 | 9/1972 | Shibahara | 525/388 |
| 4,218,353 | 8/1980 | Kim | 106/270 |

Primary Examiner—Paul R. Michl
Attorney, Agent, or Firm—Oblon, Fisher, Spivak, McClelland & Maier

[57] ABSTRACT

A process for the preparation of water-emulsifiable polyethylene by oxidizing high density polyethylene, at below the softening point of the polyethylene, in the presence of oxygen, wherein the oxidation is carried out in a fluidized bed reactor, using a polyethylene which beforehand has been heated, with exclusion of oxygen, in the presence of a compound which forms free radicals.

5 Claims, No Drawings

PREPARATION OF EMULSIFIABLE POLYETHYLENE BY OXIDIZING POLYETHYLENE IN A FLUIDIZED BED REACTOR

The present invention relates to a process for the preparation of oxidized water-emulsifiable polyethylene, wherein, because the oxidation is carried out in a fluidized bed and accordingly the temperature can be kept constant, the products obtained exhibit substantially improved adherence to specification.

In the process of German Laid-Open Application DOS No. 1,495,938, a high density polyethylene is mixed with a small amount of an organic peroxide and heated, in the presence of oxygen or of an oxygen-containing gas mixture (air), for a relatively long period at a temperature below the melting point of the polyethylene but above 100° C. The carboxyl content at the end of the oxidation is stated to be 0.2–2.0 milliequivalents per gram. Industrially, the process is intended to be carried out in an oven, a rotating drum or a fluidized bed. However, the first two methods have the disadvantage that heat energy must be supplied externally to the system, so as to heat the material, contained in the drum or the oven, to the required reaction temperature. This means that the walls of the apparatus are frequently at too high a temperature, which, unless the process is carried out carefully, can cause material to stick to the walls.

According to Table 5 German Laid-Open Application DOS No. 1,495,887, which describes the same process, operation in a fluidized bed gives, for the same oxidation time in air, a lower carbonyl content than is obtained by oven or drum treatment; only the use of pure oxygen given carbonyl contents similar to those obtained by other methods. It is therefore understandable that industry subsequently reverted to the use of oven or drum treatment.

We have recently carried out experiments on the oxidation of high density polyethylene in a fluidized bed reactor under conditions similar to those of German Laid-Open Application DOS No. 1,495,887. In the latter process, as is well known, the gas mixture, preheated to the requisite temperature, is blown onto the powder to be reacted, which is then fluidized in the closed reaction chamber, to which no external heat is supplied. We found that in spite of a long reaction time in the presence of a free radical initiator, no oxidation took place—the carbonyl content and acid numbers were zero. This result is presumably attributable to the fact that during fluidization the initiator and polyethylene become spatially separated and accordingly can no longer react with one another.

It is an object of the present invention nevertheless to carry out the oxidation of polyethylene in a fluidized bed reactor, since this dispenses with external heating and accordingly the temperature can be kept constant over the entire reactor.

Since the oxygen concentration in a fluidized bed reactor is the same around each individual particle, whether the particle be large or small, the oxidation in such a bed takes place more uniformly than in other reactors. Since, moreover, there are no temperature gradients in the fluidized bed itself, except for the edge zones, the process provides ideal oxidation conditions. The disadvantage, from the point of view of subsequent processing of the oxidized polyethylene, that large particles are oxidized more slowly at the same temperature than are small particles, is compensated by the conditions, described above, in a fluidized bed reactor. The advantage described can of course be further varied by choice of the process parameters, especially by operating under a pressure of $\leq 5$ bar.

We have found that, surprisingly, the object of the invention is achieved by a process as defined in claims 1, 2 and 3.

In this process, a high density polyethylene is employed, which has been heated at below the softening point and preferably above 90° C., with exclusion of oxygen, in the presence of an organic compound which forms free radicals and which decomposes below the softening point of polyethylene, in a reactor which is spatially separate from the fluidized bed.

A polyethylene pretreated in this way can then readily be oxidized, in a fluidized bed reactor, to acid numbers of from 10 to 50, such as are required for emulsifiable polyethylenes. Neither free radical-forming substances nor their decomposition products are detectable in the polyethylene thus pretreated, ie. they escape in a gaseous state from the system. We have found, surprisingly, that this polyethylene does not lose its activity even after storage for one year at ambient temperature. Hitherto, the chemical processes which occur during the relatively short heat treatment have not been elucidated.

In detail, the process takes place as follows:

The high density polyethylene employed is a product obtained by a low pressure Ziegler or Phillips process, and has a density of from about 0.93 to 0.97 and a melt index of less than 0.01. Such polyethylenes in general have a softening point (often incorrectly referred to as melting point) of from about 135° to 145° C.

The free radical-forming organic compounds employed are materials which decompose into free radicals under the conditions of the heat treatment of the polyethylene. For the purposes of the invention, these compounds should decompose within the duration of the heat treatment at below the softening point of the polyethylene. Examples of compounds which form free radicals and which conform to these requirements are organic peroxides, eg. dibenzoyl peroxide, lauroyl peroxide, decanoyl peroxide, di-tert.-butyl peroxide, tert.-butyl peroctoate, tert.-butyl perisobutyrate, tert.-butyl perpivalate, tert.-butyl perbenzoate, 2,5-dimethyl-2,5-di-(t-butylperoxy)-hexane, trimethylpentyl hydroperoxide, tert.-butyl hydroperoxide, disuccinoyl peroxide, bis-(4-t-butylcyclohexyl) peroxydicarbonate, cumene hydroperoxide, t-butyl per-2-ethylhexanoate and aliphatic azo compounds, eg. 2,2'-azo-bis-(2,4-dimethylvaleronitrile), 2,2'-azo-bis-(4-methyl-2,4-dimethylvaleronitrile), 2,2'-azo-bis-(2-amidinopropane) hydrochloride, 1,1'-azo-bis-(cyclohexane-1-carbonitrile), 4,4'-azo-bis-(4-cyanovaleric acid) and especially azo-bis-(2-methylpropionitrile) ("azoisobutyronitrile", abbreviated to AIBN).

The polyethylene powder is mixed with small amounts of the free radical-forming compound, preferably with from 0.05 to 2% by weight, especially from 0.1 to 1% by weight, based on polyethylene, and the mixture is heated, with exclusion of oxygen, ie. under an inert gas such as nitrogen, at below the softening point of polyethylene, preferably at 80°–130° C. The heating time is preferably from 10 to 120 minutes, but in most cases about 1 hour suffices. The polyethylene pretreated in this way is fed, without additional free radical-forming compound, to a fluidized bed reactor and is oxidized at below the softening point and above 80° C., preferably at from 10° to 5° below the softening point, with from 0.3 to 30 m³ of oxygen (for example in the form of air) per kg of polyethylene, until the acid number is from 5 to 50, preferably from 10 to 30. The total oxidation time is from about 15 to 50 hours.

The oxidized products obtained are pale, heat-resistant waxes having an iodine color number (150° C./30 minutes) of about 3, a Höppler hardness of about 1,100 bar and a melting range of from 125° to 130° C. The melt index or MFI (160° C./325 p) is from 40 to 100 units.

The products have excellent emulsifiability in a pressure autoclave, giving speck-free pale emulsions, which are added to conventional floor polish emulsions to increase the hardness of the film produced, and accordingly the mechanical resistance. Compared to the oxidized polyethylenes available on the market, for use in polishes, the products obtained by the fluidized bed process are about 100–150 bar harder and moreover give pale, speck-free emulsions even at lower acid numbers.

The latter characteristic is probably attributable to the method of oxidation, which evidently has the advantage of giving oxidation products which are more homogeneous than the conventional market products.

The novel products are also employed as PVC lubricants, for which purpose products with a low acid number are particularly preferred.

The Examples which follow illustrate the invention.

EXAMPLE 1

50 kg of a polyethylene having a density of 0.943 g/cm, a softening point of above 135° C. and a melt index (MFI 190/21.6 g/10 min) of zero are mixed with 0.25 kg of azo-bis-isobutyronitrile and the mixture is heated for 1 hour at 110°–120° C. under nitrogen. This heating decomposes the initiator, and tetramethylsuccinodinitrile and nitrogen are formed as the decomposition products. The former sublimes at the temperature employed, the sublimation being assisted by an additional slight stream of nitrogen; after as little as half an hour, no decomposition product remains detectable in the polyethylene by gas chromatography.

The polyethylene pretreated in this way is transferred to a fluidized bed reactor having a grid area of 0.25 m², and is fluidized by passage of air at 1,200 m³/h. The product temperature is kept at 126°–128° C. in the first 15 hours by means of the hot air, and is then lowered to 124°–126° C. The total oxidation time is 34 hours. The course of the oxidation is monitored by periodically determining the acid number by titrating a sample, dissolved in hot xylene, with ethanolic potassium hydroxide solution.

| Oxidation time hours | Acid number mg of KOH/g |
|---|---|
| 5 | 1.0 |
| 10 | 2.7 |
| 15 | 7.1 |
| 22 | 13.0 |
| 25 | 15.0 |
| 30 | 18.0 |
| 34 | 22.0 |

COMPARATIVE EXAMPLE 1

50 kg of a polyethylene having a density of 0.943 g/cm³, a softening point of 136° C. and a melt index of zero are mixed with 0.25 kg of azo-bis-isobutyronitrile and the mixture is introduced into a fluidized bed reactor having a grid surface of 0.25 m². The product is then fluidized by passage of air at 1,200 m³ (S.T.P.)/h and at the same time is heated to 124° C. by the hot air. After 23 hours' fluidization, the degree of oxidation of a sample is determined from the acid number, itself determined by titration; virtually no oxidative degradation has occurred.

COMPARATIVE EXAMPLE 2

50 kg of polyethylene (Comparative Example 1) are fluidized in a fluidized bed reactor at 25° C. (room temperature), by a stream of air of 5,000 m³/h.m², and at the same time are sprayed with 2.75 kg of a solution of 0.2 kg of azo-bis-isobutyronitrile in 2.5 kg of chloroform. The product temperature is the brought to 126° C. by passage of hot air. A sample examined after 11 hours' reaction time shows no significant content of carboxyl groups.

COMPARATIVE EXAMPLE 3

The procedure described in Comparative Example 2 is followed, except that whilst being sprayed the product is turned over only occasionally, so as to ensure wetting of the product surface. The polyethylene powder is then fluidized for 15 hours at 126°–128° C. by passage of hot air. A sample taken after this time again shows no oxidative degradation whatsoever.

Use Performance tests

In Example 1, samples were taken after 22, 25, 30 and 34 hours and tested for their lubricant action on PVC, and their emulsifiability.

The PVC lubricant test showed that regardless of the acid number all the products exhibited substantially better compatibility than did the starting material, and accordingly the products were particularly useful for the preparation of transparent PVC articles.

To test for emulsifiability, the oxidized products were emulsified in a pressure autoclave, in accordance with the following recipe: 100 parts of water, 2.9 parts of potassium hydroxide, 1 part of sodium bisulfite, 26 parts of oxidized high density polyethylene and 24 parts of oxyethylated alkylphenol were introduced into a 1 liter pressure autoclave fitted with a stirrer, heater and feed vessel. The mixture was heated to 150°–160° C. and 150 parts of water were added. On cooling this mixture, pale, transparent, speck-free high density polyethylene dispersions were obtained. These are characterized in the Table which follows.

| Oxidation product from Experiment 1 after ... hours | Iodine color number of the melt after 30 minutes | Acid number Saponification number | Solidification point \|°C.\| | Hoppler hardness \|bar\| | Light transmission of the high density polyethylene dispersion \|%\| | MFI* 325/160° C. |
| --- | --- | --- | --- | --- | --- | --- |
| 22 | 3 | 13/24 | 125 | about 1,100 | 60 | 37 |
| 25 | 3 | 15/26 | 124 | about 1,100 | 65 | 40 |
| 30 | 3 | 18/3 | 123 | about 1,100 | 70 | 45 |
| 34 | 3 | 22/38 | 123 | about 1,100 | 75 | 60 |
| Comparative Example 1 | 1–2 | 1 | not measurable | not measurable | non-emulsifiable | not measurable |
| Example 1 of German Published Application DAS 1,495,938 | 7 | 28/39 | 123 | about 950 | 50 | about 200 |
| Example 1 of German Published Application DAs 1,495,938, but with low degree of oxidation | 3 | 15/16 | 125 | about 1,000 | 30 | about 80 |

*Melt flow index ASTM D 1238 - GST DIN 53,735 (1970)
Hoppler hardness: DFG standard method M - III 9a (57)

We claim:

1. A process for the preparation of water-emulsifiable polyethylene which comprises (a) heating high density polyethylene with exclusion of oxygen at a temperature below the softening point of the polyethylene, in the presence of an organic compound which forms free radicals and decomposes below the softening point of the polyethylene, in a reactor with decomposition of said organic compound and thereafter (b) in a spatially separate fluidized bed reactor oxidizing the high density polyethylene produced by step (a) by the process consisting essentially of passage of oxygen or air through the same under fluidizing conditions at a temperature below the softening point of the polyethylene and above 80° C.

2. The process according to claim 1 wherein the high density polyethylene has a density of 0.93 to 0.97, a melt index of less than 0.01 and a softening point of 135° to 145° C., wherein in step (a) the organic compound which forms free radicals is present in 0.05 to 2% by weight of the polyethylene, the heating occurs at 80° to 130° C. and the heating time is 10 to 120 minutes and wherein in step (b) the temperature is above 80° C. up to 5° C. below the softening point, oxygen is present in amounts of 0.3 to 30 m³ per kg of polyethylene and is added as air and the process is carried out until a product of acid number of from 5 to 50 is obtained.

3. A process as claimed in claim 2, wherein azo-bis-(2-methylpropionitrile) is employed as the compound which forms free radicals.

4. A process as claimed in claim 1, wherein the polyethylene employed has been treated in the presence of from 0.05 to 2% by weight, based on polyethylene, of the compound which forms free radicals.

5. A process as claimed in claim 1, wherein azo-bis-(2-methylpropionitrile) is employed as the compound which forms free radicals.

* * * * *